United States Patent
Kishi

(10) Patent No.: US 9,280,734 B2
(45) Date of Patent: Mar. 8, 2016

(54) IMAGE FORMING APPARATUS THAT PERFORMS HIGHLY-ACCURATE CALIBRATION, CALIBRATION PROGRAM, AND CALIBRATION SYSTEM

(71) Applicant: KYOCERA Document Solutions Inc., Osaka (JP)

(72) Inventor: Yoshitaka Kishi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 28 days.

(21) Appl. No.: 14/682,572

(22) Filed: Apr. 9, 2015

(65) Prior Publication Data
US 2015/0294204 A1    Oct. 15, 2015

(30) Foreign Application Priority Data
Apr. 15, 2014   (JP) ................. 2014-083540

(51) Int. Cl.
  *H04N 1/60*   (2006.01)
  *G06K 15/02*  (2006.01)
  *G06K 1/00*   (2006.01)

(52) U.S. Cl.
  CPC ................... *G06K 15/1878* (2013.01)

(58) Field of Classification Search
  None
  See application file for complete search history.

(56) References Cited

U.S. PATENT DOCUMENTS

2007/0086071 A1*  4/2007  Gila ............... G06T 7/0004
                                                      358/518

FOREIGN PATENT DOCUMENTS

| JP | 2006-222552 A |   | 8/2006  |
| JP | 2006222552 A  | * | 8/2006  |
| JP | 2010-226562 A |   | 10/2010 |

* cited by examiner

*Primary Examiner* — Quang N Vo
(74) *Attorney, Agent, or Firm* — Stein IP, LLC

(57) ABSTRACT

An image forming apparatus includes a print device, a tone correction unit, a peripheral light quantity drop detecting unit, and a color value correction unit. The tone correction unit corrects a tone characteristic of the print device based on color values of a plurality of color patches of each of a reference chart and a test chart in an image. The image is generated by simultaneously taking a reference sheet and a test sheet by an imaging device. The reference chart is drawn on the reference sheet. The test chart is printed on the test sheet by the print device. The peripheral light quantity drop detecting unit detects the amount of the peripheral light quantity drop in each of the patches based on the positions and luminances of the plurality of reference regions in the image and the positions of the patches in the image.

7 Claims, 14 Drawing Sheets

IMAGE FORMING APPARATUS THAT PERFORMS HIGHLY-ACCURATE CALIBRATION, CALIBRATION PROGRAM, AND CALIBRATION SYSTEM

INCORPORATION BY REFERENCE

This application is based upon, and claims the benefit of priority from, corresponding Japanese Patent Application No. 2014-083540 filed in the Japan Patent Office on Apr. 15, 2014, the entire contents of which are incorporated herein by reference.

BACKGROUND

Unless otherwise indicated herein, the description in this section is not prior art to the claims in this application and is not admitted to be prior art by inclusion in this section.

A typical image forming apparatus, such as a printer-only machine and a Multifunction Peripheral (MFP), has input-output characteristics that changes due to a cause such as a secular change of a print device. For example, there is known the following two methods as calibration methods performing a correction of the input/output characteristics, so-called gamma correction.

The first method forms a plurality of color patches on an image carrier on which a toner image is to be formed, and then detects color values of the patches formed on the image carrier with a sensor, so as to correct the input-output characteristics based on the detected color values.

The second method prints a plurality of color patches on a recording medium such as a paper sheet, then reads color values of the patches printed on the recording medium with a reading device such as a scanner, and detects the color values of the patches in an image read and generated by the reading device, so as to correct the input-output characteristics based on the detected color values.

Comparing the above-described two methods, the second method detects the color values of the patches actually printed on the recording medium. Compared with the first method, the second method ensures highly-accurate calibration.

However, with an image forming apparatus that does not include the reading device, such as the scanner, such as the printer-only machine, since the image forming apparatus does not include the reading device, the image forming apparatus cannot perform the second method. Therefore, the image forming apparatus needs to perform the calibration by the first method.

Therefore, there has been proposed a new method that does not read the patches printed on the recording medium by the reading device such as the scanner, records the patches by an imaging device, such as a digital camera, located outside of the image forming apparatus, and then detects color values of the patches in an image taken and generated by the imaging device, so as to correct the input-output characteristics based on the detected color values.

A typical calibration method first simultaneously takes a reference sheet and a test sheet with the imaging device. On the reference sheet, a reference chart that includes a plurality of color patches is drawn. On the test sheet, a test chart that includes a plurality of color patches is printed with the print device of the image forming apparatus. Based on an RGB value of each patch of the reference chart and the test chart in the image taken and generated by the imaging device, tone characteristics of the print device are corrected.

Another typical calibration method first separately takes a reference sheet and a test sheet with the imaging device. On the reference sheet, a reference chart that includes a plurality of color patches is drawn. On the test sheet, a test chart that includes a plurality of color patches is printed with the print device of the image forming apparatus. Subsequently, based on color values of patches of the reference chart in the first image taken and generated by the imaging device and color values of patches of the test chart in the second image taken and generated by the imaging device, a first correction value is calculated. Based on the color values of the patches in the reference chart in the first image taken and generated by the imaging device and reference color values preliminary stored in an image forming apparatus, a second correction value is calculated. Then, based on the first correction value and the second correction value, tone characteristics of the print device are corrected.

SUMMARY

An image forming apparatus according to one aspect of the disclosure includes a print device, a tone correction unit, a peripheral light quantity drop detecting unit, and a color value correction unit. The tone correction unit corrects a tone characteristic of the print device based on color values of a plurality of color patches of each of a reference chart and a test chart in an image. The image is generated by simultaneously taking a reference sheet and a test sheet by an imaging device. The reference chart including the plurality of color patches is drawn on the reference sheet. The test chart including the plurality of color patches is printed on the test sheet by the print device. The peripheral light quantity drop detecting unit detects an amount of a peripheral light quantity drop caused by the imaging device for each patch in the image. The color value correction unit corrects the color value of the patch in the image based on the amount of the peripheral light quantity drop detected by the peripheral light quantity drop detecting unit. The tone correction unit corrects the tone characteristic based on the color value corrected by the color value correction unit At least one of the reference sheet and the test sheet includes a plurality of reference regions arranged at specific positions with respect to the patches. The peripheral light quantity drop detecting unit detects the amount of the peripheral light quantity drop in each of the patches based on the positions and luminances of the plurality of reference regions in the image and the positions of the patches in the image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
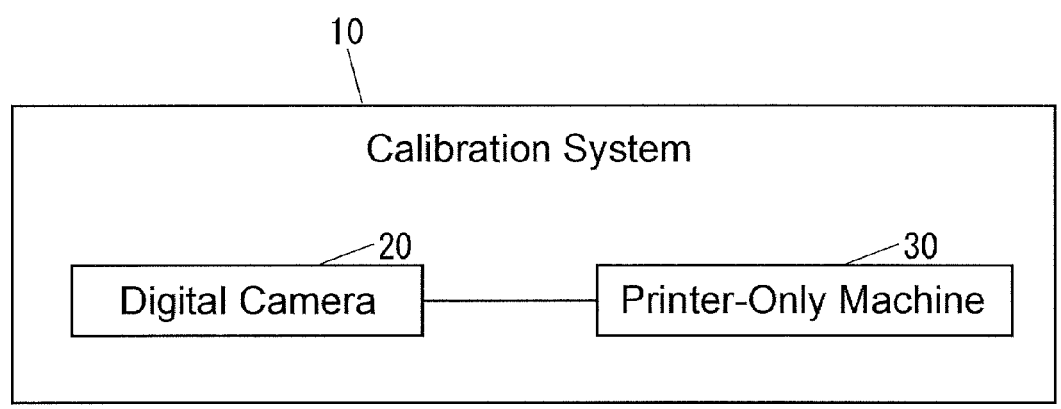
FIG. 1 illustrates a block configuration of a calibration system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to drawings.

First, a description will be given of a configuration of a calibration system according to the embodiment.

FIG. 1 is a schematic diagram illustrating a block configuration of a calibration system 10 according to the embodiment.

As illustrated in FIG. 1, the calibration system 10 includes a digital camera 20 as an imaging device and a printer-only machine 30 as an image forming apparatus. The digital camera 20 and the printer-only machine 30 are communicatively configured with one another. Here, the digital camera 20 may be capable of communicating with the printer-only machine 30 one another via a network such as a Local Area Network (LAN), or the Internet, or may even be directly capable of communicating with the printer-only machine 30 one another via a communication cable such as a Universal Serial Bus (USB) cable, not via the network.

Figure 2:
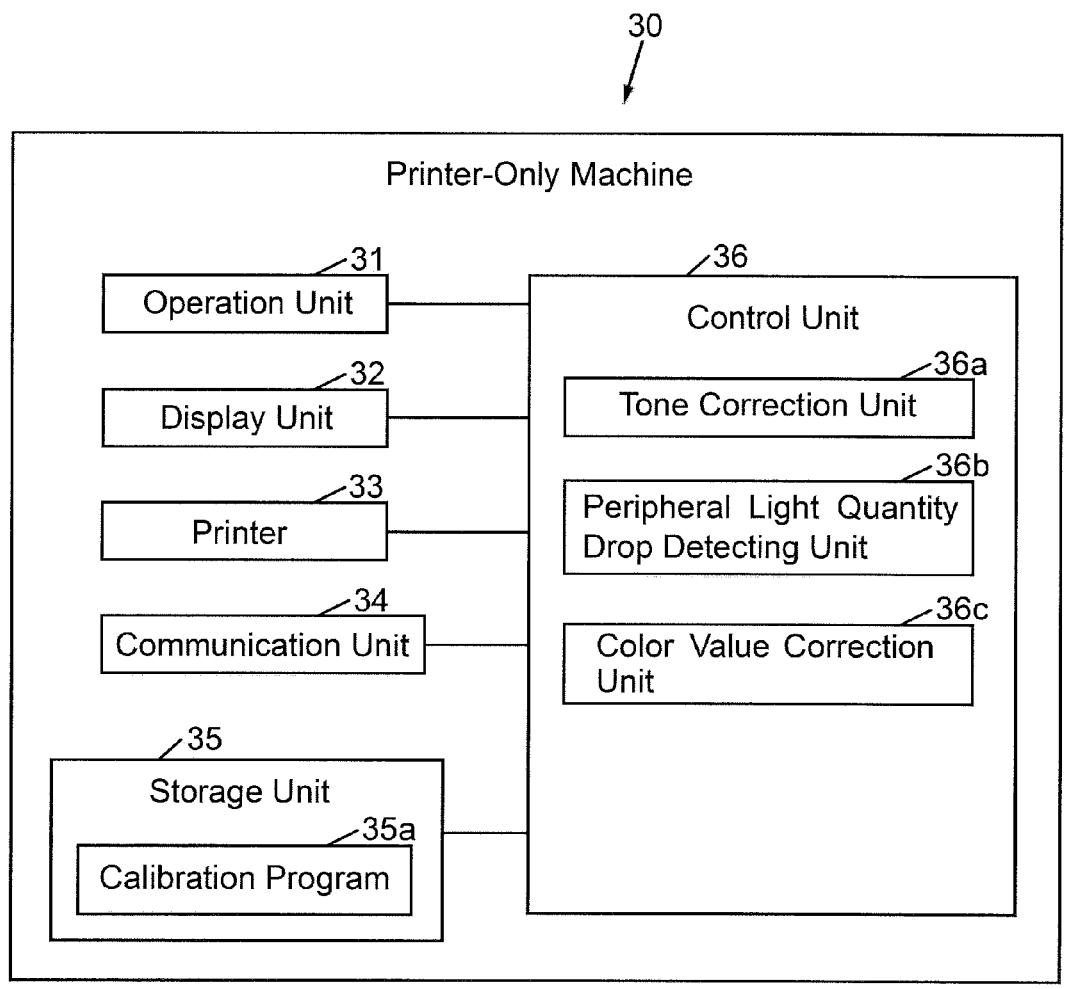
FIG. 2 illustrates a block configuration of a printer-only machine according to the one embodiment.

FIG. 2 is a schematic diagram illustrating a block configuration of the printer-only machine 30 according to the embodiment.

As illustrated in FIG. 2, the printer-only machine 30 includes an operation unit 31, a display unit 32, a printer 33, a communication unit 34, a storage unit 35, and a control unit 36 controlling the whole printer-only machine 30. The operation unit 31 may be an input device such as buttons with which various operations are input. The display unit 32 may be a display device such as a Liquid Crystal Display (LCD) displaying various kinds of information. The printer 33 may be a print device that executes print job on a recording medium such as a paper sheet. The communication unit 34 may be a communication device that communicates with an external device such as the digital camera 20 (see FIG. 1) and a Personal Computer (PC). The storage unit 35 may be a non-volatile storage device, such as an Electrically Erasable Programmable Read Only Memory (EEPROM) storing various data.

The storage unit 35 stores a calibration program 35$a$ for correction of tone characteristics of the printer 33. The calibration program 35$a$ may be installed in the printer-only machine 30 at production stage of the printer-only machine 30, or may be additionally installed in the printer-only machine 30 from a storage medium such as a SD card or a Universal Serial Bus (USB) memory, or may be additionally installed in the printer-only machine 30 on the network.

Figure 3:
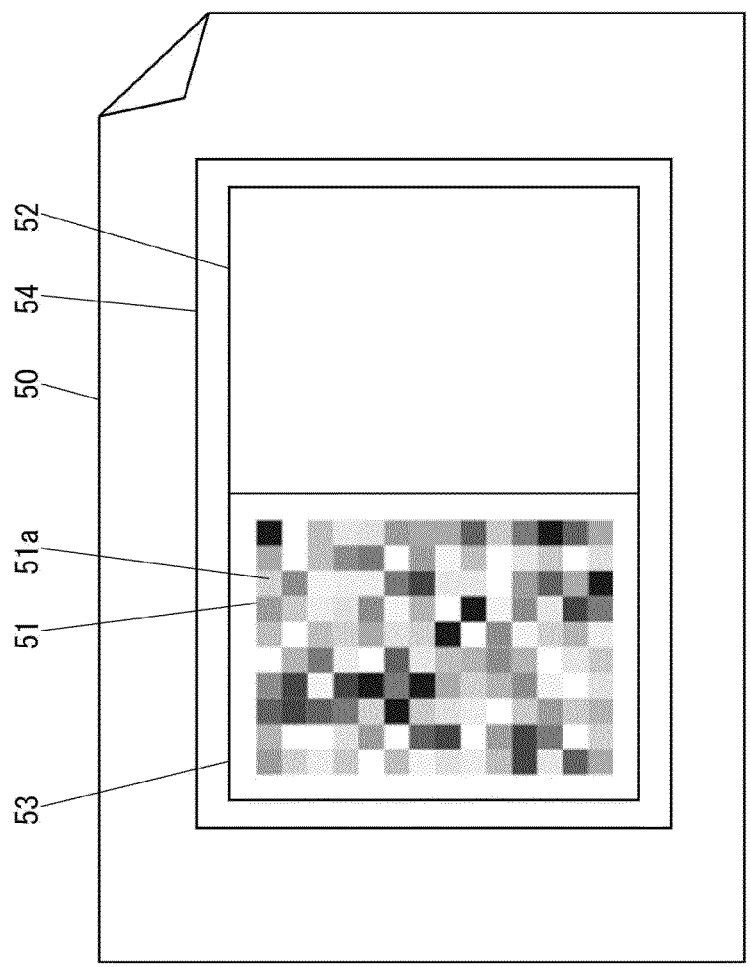
FIG. 3 illustrates a schematic diagram of a reference sheet and a test sheet used in execution of a calibration program according to the one embodiment in a plan view.
Figure 3:
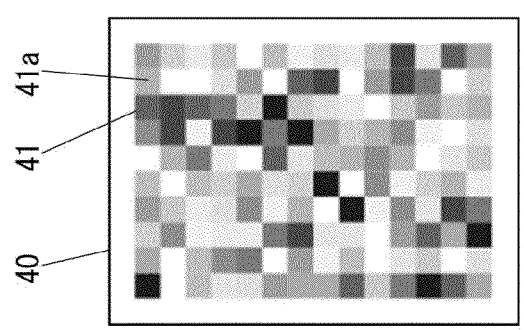

FIG. 3 is a schematic diagram of a plan view illustrating a reference sheet 40 and a test sheet 50 used in execution of the calibration program 35$a$.

As illustrated in FIG. 3, on the reference sheet 40, a reference chart 41 including a plurality of colors of patches 41$a$ is drawn.

The printer 33 prints a test chart 51, a reference sheet arranging image 52, a frame border 53, and a projective transformation image 54 on the test sheet 50. The test chart 51 includes a plurality of colors of patches 51$a$. The frame border 53 surrounds the test chart 51. The reference sheet arranging image 52 is an image for specifying a position where the reference sheet 40 is to be arranged, such as the frame border surrounding the position where the reference sheet 40 is to be arranged. The projective transformation image 54 works as a sign during a projective transformation, which will be described later, such as the frame border surrounding the entire reference chart 41 and test chart 51.

The test chart 51 is similar to the one where the reference chart 41 is reversely printed. However, the test chart 51 printed on the test sheet 50 is printed by the printer 33. Accordingly, compared with the reference chart 41, which is drawn on the reference sheet 40, the test chart 51 is inferior in accuracy of a color value.

Figure 4:
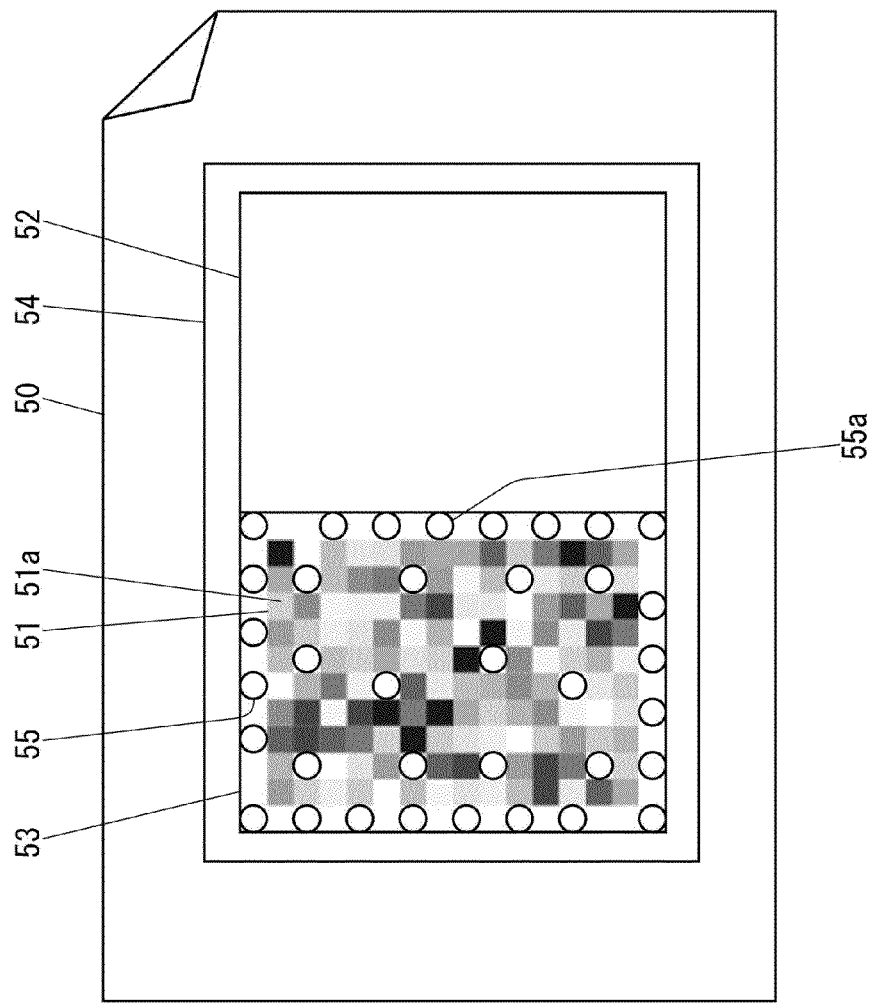
FIG. 4 illustrates a schematic diagram of the reference sheet and the test sheet according to the one embodiment in a state of showing reference regions in a plan view.
Figure 4:
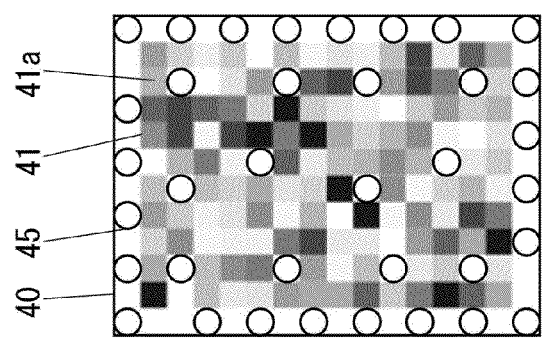

FIG. 4 is a schematic diagram of a plan view illustrating the reference sheet 40 and the test sheet 50 in a state of showing reference regions 45 and reference regions 55.

As illustrated in FIG. 4, the reference sheet 40 includes the plurality of reference regions 45. The reference regions 45 are arranged at specific positions with respect to the patches 41$a$. Some of the plurality of reference regions 45 are arranged in the reference chart 41, and the remainder is arranged outside of the reference chart 41. The plurality of reference regions 45 are arranged at intervals of approximately uniform. The color of the plurality of reference regions 45 is all the identical.

Similarly, the test sheet 50 includes the plurality of reference regions 55. The reference regions 55 are arranged at specific positions with respect to the patches 51a. Some of the plurality of reference regions 55 are arranged in the test chart 51, and the remainder is arranged outside of the test chart 51. The plurality of reference regions 55 are arranged at intervals of approximately uniform. The color of the plurality of reference regions 55 is all the identical.

For easy understanding, FIG. 4 illustrates circles surrounding the reference regions 45 and the reference regions 55. However, actually, on the reference sheet 40 and the test sheet 50, the circles surrounding the reference regions 45 and the reference regions 55 are not illustrated in FIG. 3.

The patches 41a in the reference chart 41 are rectangular regions that do not include the reference regions 45. Similarly, the patches 51a in the test chart 51 are rectangular regions that do not include the reference regions 55.

Figure 5:
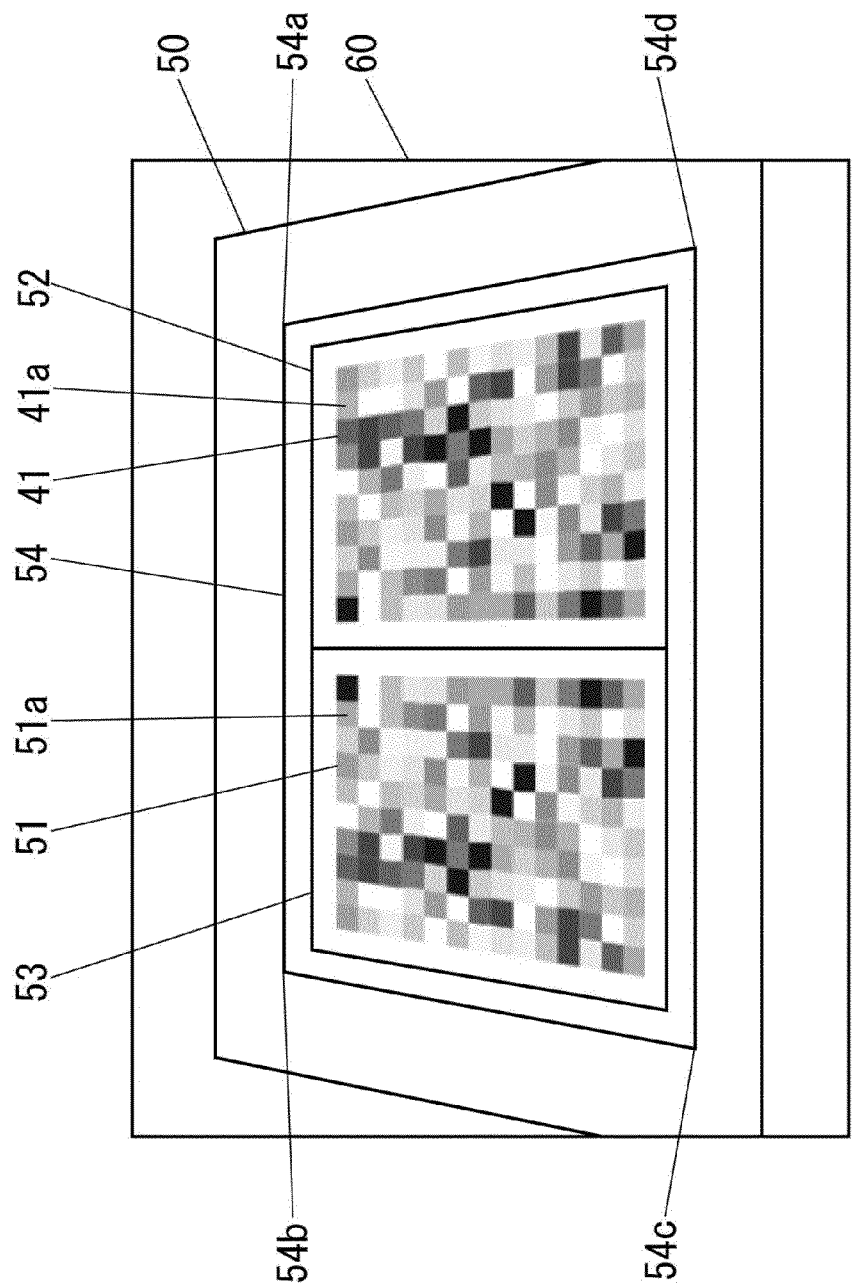
FIG. 5 illustrates a schematic diagram of an exemplary content of an image taken and generated with a digital camera according to the one embodiment.

FIG. 5 is a schematic diagram illustrating an exemplary content of an image 60 taken and generated by the digital camera 20 (see FIG. 1).

The image 60 illustrated in FIG. 5 is an image generated by simultaneously taking the reference sheet 40 and the test sheet 50 with the digital camera 20. That is, the reference sheet 40 is arranged matching the reference sheet arranging image 52 of the test sheet 50. Then, the image 60 is generated by simultaneously taking the reference sheet 40 and the test sheet 50 with the digital camera 20 such that the position near the intermediate between the reference sheet 40 and the test sheet 50 becomes the center of the image.

The control unit 36, which is illustrated in FIG. 2, includes, for example, a Central Processing Unit (CPU), a Read Only Memory (ROM) storing programs and various kinds of data, and a Random Access Memory (RAM) used as a work area for the CPU. The CPU executes programs stored in the ROM or the storage unit 35.

The control unit 36 functions as a tone correction unit 36a, a peripheral light quantity drop detecting unit 36b, and a color value correction unit 36c. The tone correction unit 36a executes the calibration program 35a stored in the storage unit 35 to correct tone characteristics of the printer 33 based on color values of the patches 41a (see FIG. 5) in the reference chart 41 (see FIG. 5) and the patches 51a (see FIG. 5) in the test chart 51 (see FIG. 5) in the image 60 (see FIG. 5). The peripheral light quantity drop detecting unit 36b detects an amount of peripheral light quantity drop caused by the digital camera 20 (see FIG. 1) for each of the patch 41a and the patch 51a in the image 60. The color value correction unit 36c corrects the color values of the patches 41a and the patches 51a in the image 60 based on the amount of peripheral light quantity drop detected by the peripheral light quantity drop detecting unit 36b.

Next, a description will be given of a calibration method according to the embodiment.

First, according to an instruction accepted via the operation unit 31 or the communication unit 34, the control unit 36 of the printer-only machine 30 executes the calibration program 35a stored in the storage unit 35. Accordingly, the printer-only machine 30 prints the test chart 51, the reference sheet arranging image 52, the frame border 53, and the projective transformation image 54 on a storage medium by the printer 33, thus generating the test sheet 50.

Next, a user of the printer-only machine 30 arranges the preliminary prepared reference sheet 40 matching the reference sheet arranging image 52 of the test sheet 50. Then, the user simultaneously takes the reference sheet 40 and the test sheet 50 with the digital camera 20 such that the position near the intermediate between the reference sheet 40 and the test sheet 50 becomes the center of the image. Accordingly, the digital camera 20 generates the image 60 illustrated in FIG. 5.

Next, according to an instruction accepted via the operation unit 31 or the communication unit 34, the control unit 36 of the printer-only machine 30 executes the calibration program 35a stored in the storage unit 35. Accordingly, the control unit 36 performs the operations illustrated in FIG. 6.

Figure 6:
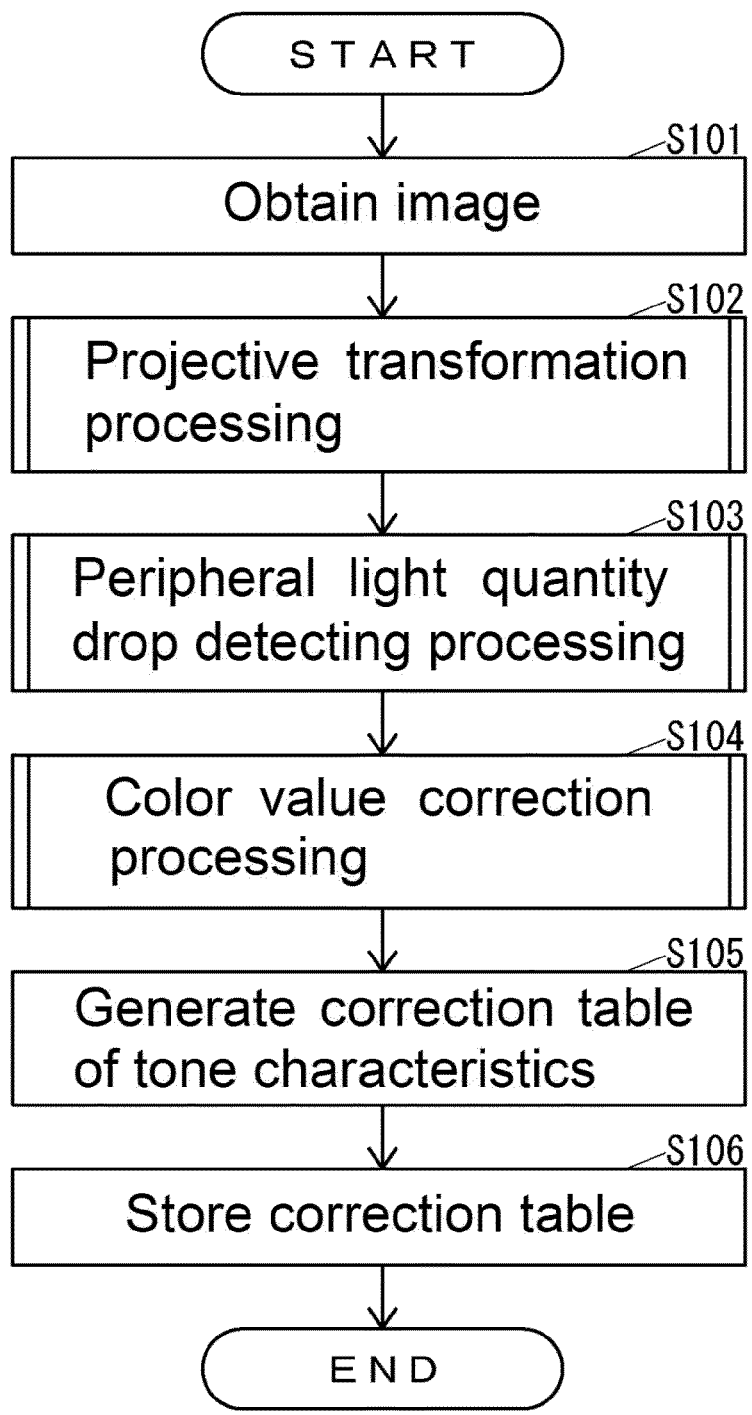
FIG. 6 illustrates a flowchart of an operation of a printer-only machine according to the one embodiment when performing a calibration.

FIG. 6 is a flowchart of an operation of the printer-only machine 30 when performing the calibration.

As illustrated in FIG. 6, the tone correction unit 36a of the control unit 36 obtains the image 60 from the digital camera 20 via the communication unit 34 (Step S101).

Next, the tone correction unit 36a performs the projective transformation process that performs the projective transformation on the image 60 to align the shapes of the reference chart 41 and the test chart 51 in the image 60, which is obtained at Step S101 (Step S102).

Figure 7:
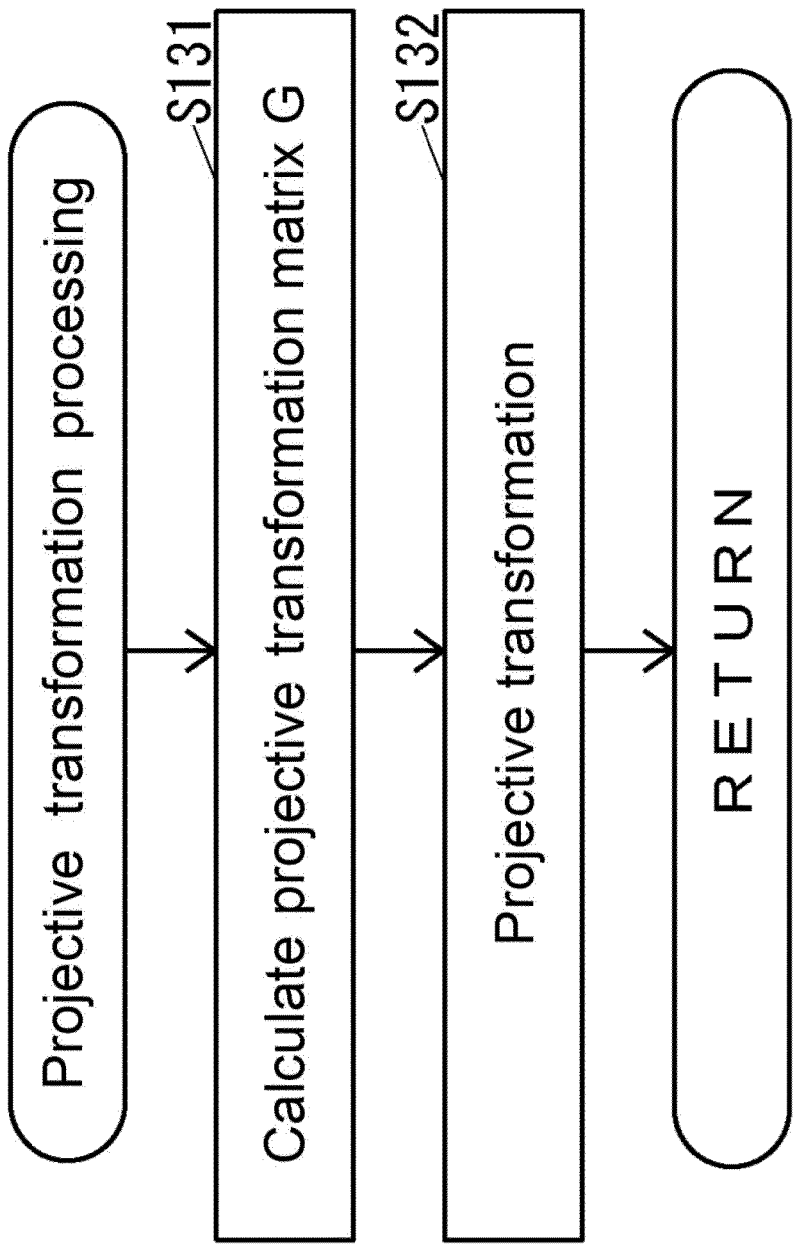
FIG. 7 illustrates a flowchart of a projective transformation process according to the one embodiment.

FIG. 7 is a flowchart of the projective transformation process illustrated in FIG. 6.

As illustrated in FIG. 7, the tone correction unit 36a calculates a projective transformation matrix G that performs the projective transformation on the image 60 based on: coordinates of points 54a, 54b, 54c, and 54d (see FIG. 5) at four corners of the projective transformation image 54 (see FIG. 5) before the projective transformation at Step S102, and coordinates of the points 54a, 54b, 54c, and 54d at four corners of the projective transformation image 54 after the projective transformation at Step S102 (Step S131). The coordinates of the points 54a, 54b, 54c, and 54d at the four corners of the projective transformation image 54 after the projective transformation at Step S102 are preset fixed values.

Here, assume that the coordinate of the point 54a before the projective transformation at Step S102 as $(x_1', y_1')$, and the coordinate of the point 54a after the projective transformation at Step S102 as $(x_1, y_1)$. The coordinate $(x_1', y_1')$ and the coordinate $(x_1, y_1)$ can be expressed by the formula shown in Formula 2 using a projective transformation matrix H shown in Formula 1.

$$H = \begin{pmatrix} a & b & c \\ d & e & f \\ g & h & 1 \end{pmatrix} \quad \text{[Formula 1]}$$

$$\begin{pmatrix} x_1' \\ y_1' \\ 1 \end{pmatrix} \cong \begin{pmatrix} a & b & c \\ d & e & f \\ g & h & 1 \end{pmatrix} \times \begin{pmatrix} x_1 \\ y_1 \\ 1 \end{pmatrix} \quad \text{[Formula 2]}$$

From the formula shown in Formula 2, the formula shown in Formula 3 can be obtained for $x_1'$, and the formula shown in Formula 4 can be obtained for $y_1'$.

$$x_1' = \frac{ax_1 + by_1 + c}{gx_1 + hy_1 + 1} \quad \text{[Formula 3]}$$

$$y_1' = \frac{dx_1 + ey_1 + f}{gx_1 + hy_1 + 1} \quad \text{[Formula 4]}$$

Similarly, assume that the coordinates of the points 54b, 54c, and 54d before the projective transformation at Step S102 respectively as $(x_2', y_2')$, $(x_3', y_3')$, and $(x_4', y_4')$, while the coordinate of the points 54b, 54c, and 54d after the projective transformation at Step S102 respectively as $(x_2, y_2)$, $(x_3, y_3)$, and $(x_4, y_4)$. Regarding $x_2'$, $x_3'$, and $x_4'$, the formulas similar to the formula shown in Formula 3 are obtained, and regarding 'y$_2$, 'y$_3$, and 'y$_4$, the formulas similar to the formula shown in Formula 4 are obtained. Thus, the formula shown in Formula 5 can be obtained.

$$\begin{pmatrix} x_1 & y_1 & 1 & 0 & 0 & 0 & -x_1 \times x'_1 & -y_1 \times x'_1 \\ 0 & 0 & 0 & x_1 & y_1 & 1 & -x_1 \times y'_1 & -y_1 \times y'_1 \\ x_2 & y_2 & 1 & 0 & 0 & 0 & -x_2 \times x'_2 & -y_2 \times x'_2 \\ 0 & 0 & 0 & x_2 & y_2 & 1 & -x_2 \times y'_2 & -y_2 \times y'_2 \\ x_3 & y_3 & 1 & 0 & 0 & 0 & -x_3 \times x'_3 & -y_3 \times x'_3 \\ 0 & 0 & 0 & x_3 & y_3 & 1 & -x_3 \times y'_3 & -y_3 \times y'_3 \\ x_4 & y_4 & 1 & 0 & 0 & 0 & -x_4 \times x'_4 & -y_4 \times x'_4 \\ 0 & 0 & 0 & x_4 & y_4 & 1 & -x_4 \times y'_4 & -y_4 \times y'_4 \end{pmatrix} \times$$ [Formula 5]

$$\begin{pmatrix} a \\ b \\ c \\ d \\ e \\ f \\ g \\ h \end{pmatrix} = \begin{pmatrix} x'_1 \\ y'_1 \\ x'_2 \\ y'_2 \\ x'_3 \\ y'_3 \\ x'_4 \\ y'_4 \end{pmatrix}$$

Solving the eight simultaneous equations shown in the formulas of Formula 5 can obtain matrix elements a to h in the projective transformation matrix H. That is, the projective transformation matrix H can be obtained.

Note that the projective transformation matrix H is a matrix for the projective transformation of the image after the projective transformation at Step S102 into the image before the projective transformation at Step S102 as expressed by the formula shown in Formula 2. Accordingly, the projective transformation matrix G for the projective transformation on the image 60, that is, the projective transformation matrix for the projective transformation on the image before the projective transformation at Step S102 into the image after the projective transformation at Step S102 becomes an inverse matrix $H^{-1}$ of the projective transformation matrix H. The inverse matrix $H^{-1}$ is obtained by the formula shown in Formula 6.

$$G = H^{-1} = \frac{1}{\det H} \begin{pmatrix} e - fh & ch - b & bf - ce \\ fg - d & a - cg & cd - af \\ dh - eg & bg - ah & ae - bd \end{pmatrix}$$ [Formula 6]

※ det $H = ae + dhc + gbf - ahf - gec - db$

After the process of Step S131, the tone correction unit 36a performs the projective transformation on the image 60 based on the projective transformation matrix G, which is calculated at Step S131 (Step S132). Thus, the projective transformation process illustrated in FIG. 7 is terminated.

Figure 8:
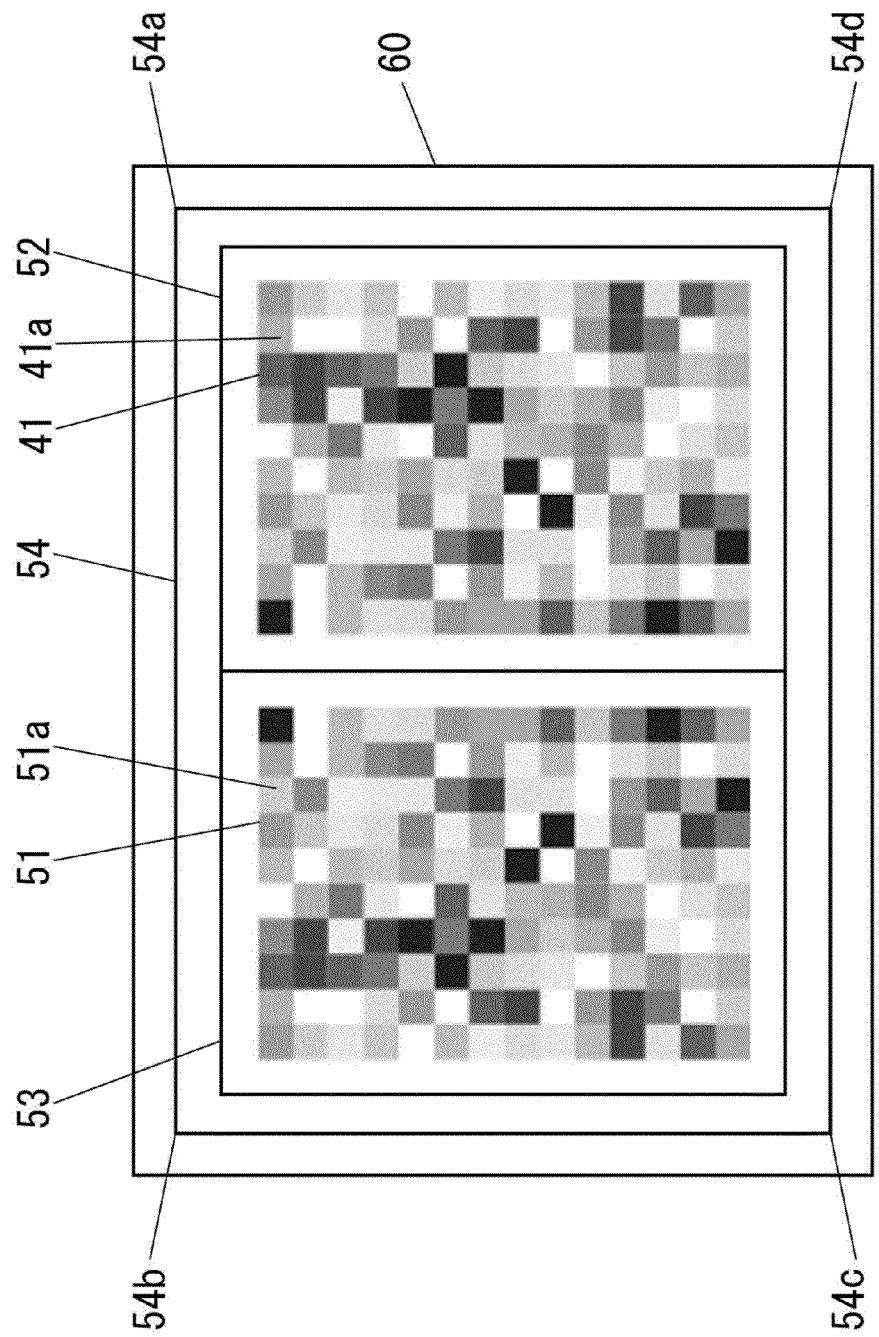
FIG. 8 illustrates a schematic diagram of a state where a projective transformation is performed on the image illustrated in FIG. 5 by the projective transformation process illustrated in FIG. 7.

FIG. 8 is a schematic diagram illustrating a state where the projective transformation is performed on the image 60 illustrated in FIG. 5 by the projective transformation process illustrated in FIG. 7.

As illustrated in FIG. 8, the projective transformation is performed on the image 60 illustrated in FIG. 5 by the projective transformation process illustrated in FIG. 7. Thus, an inclination caused by taking the image with digital camera 20 is corrected.

As illustrated in FIG. 6, when terminating the projective transformation process at Step S102, the peripheral light quantity drop detecting unit 36b of the control unit 36 performs the peripheral light quantity drop detecting process (Step S103). The peripheral light quantity drop detecting process detects the amount of peripheral light quantity drop caused by the digital camera 20 from each patch in the image 60 where the projective transformation is performed at Step S102.

Figure 9:
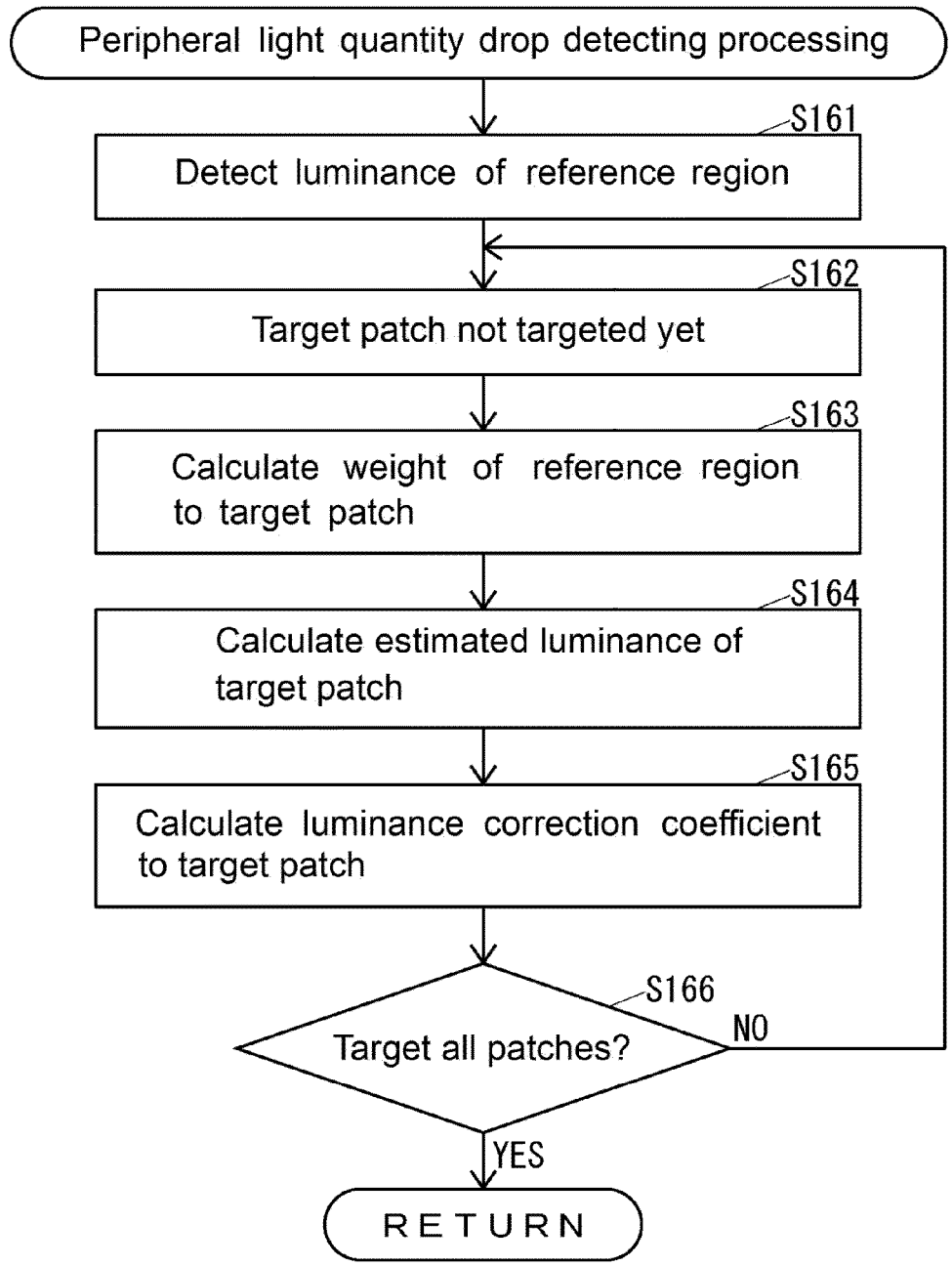
FIG. 9 illustrates a flowchart of a peripheral light quantity drop detecting process according to the one embodiment.

FIG. 9 illustrates a flowchart of the peripheral light quantity drop detecting process shown in FIG. 6.

As illustrated in FIG. 9, the peripheral light quantity drop detecting unit 36b specifies the reference region 55 based on the position of the reference region 55 in the image 60 where the projective transformation is performed at Step S102. Then, the peripheral light quantity drop detecting unit 36b detects luminance of each of the reference regions 55 in the image 60 where the projective transformation is performed at Step S102 (Step S161). Here, the position of the reference region 55 is a fixed value preset to the position of the patch 51a. The luminance of the reference region 55 is calculated, for example, as the formula shown in Formula 12 based on the RGB value of the reference region 55 in the image 60 where the projective transformation is performed at Step S102.

Next, the peripheral light quantity drop detecting unit 36b targets the patch 51a not targeted yet among the plurality of patches 51a in the test chart 51 in the image 60 where the projective transformation is performed at Step S102 (Step S162).

Next, the peripheral light quantity drop detecting unit 36b calculates a weight $W_i$ of the reference region 55 to the target patch 51a based on the position of the target patch 51a and the position of the reference region 55 as shown in Formula 7 (Step S163). Here, the position of the patch 51a and the position of the reference region 55 are preset fixed values. The position of the patch 51a is expressed by the center coordinate $(x_p, y_p)$ of the patch 51a. The position of the reference region 55 is expressed by the center coordinate $(x_i, y_i)$ of the reference region 55. Here, i is an integer from 1 to n, a total count of the reference regions 55. That is, the positions of the plurality of reference regions 55 in the image 60 where the projective transformation is performed at Step S102 is specifically expressed by the respective coordinates $(x_1, y_1)$, $(x_2, y_2)$, ..., $(x_{n-1}, y_{n-1})$, and $(x_n, y_n)$. As shown in Formula 7, the weight $W_i$ is a reciprocal of a distance from the target patch 51a to the reference region 55.

$$W_i = \frac{1}{\sqrt{(x_i - x_p)^2 + (y_i - y_p)^2}}$$ [Formula 7]

Next, the peripheral light quantity drop detecting unit 36b calculates an estimated luminance $Y_p$ of the target patch 51a based on the weight $W_i$, which is calculated at Step S163, and a luminance $Y_i$ of the reference region 55 as shown in Formula 8 (Step S164). Assuming that the target patch 51a is drawn with the color identical to the reference region 55, the estimated luminance $Y_p$ of the target patch 51a is an estimated luminance of the target patch 51a. Here, the luminances $Y_i$ of the plurality of reference regions 55 in the image 60 where the projective transformation is performed at Step S102 are specifically expressed by respective $Y_1, Y_2, \ldots, Y_{n-1}, Y_n$, and $Y_n$. As shown in Formula 8, the estimated luminance $Y_p$ of the target patch 51a is a weighted average of weighting the weight $W_i$ to the luminance $Y_i$ of the reference region 55.

$$Y_p = \frac{\sum_{i=1}^{n} W_i Y_i}{\sum_{i=1}^{n} W_i} \quad \text{[Formula 8]}$$

Figure 10:
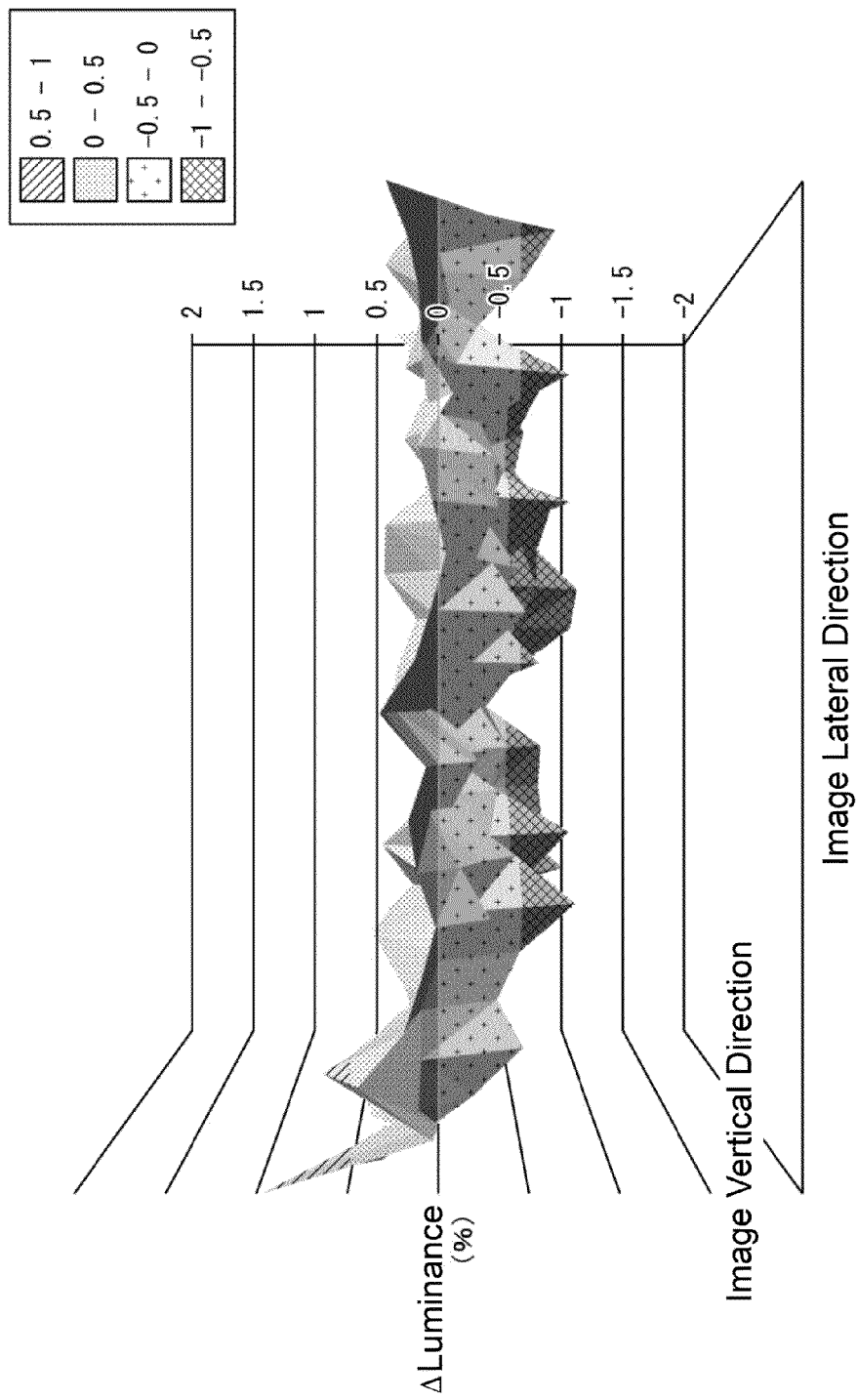
FIG. 10 illustrates a schematic diagram of an exemplary error between estimated luminance of a patch and an actual luminance of the patch when the patch according to the one embodiment is drawn with an identical color to the reference region.

FIG. 10 is a schematic diagram illustrating an exemplary error between the estimated luminance $Y_p$ of the patch 51a and an actual luminance of the patch 51a when the patch 51a is drawn with an identical color to the reference region 55.

In FIG. 10, ΔLuminance indicates a value expressing a difference between the estimated luminance $Y_p$ of the patch 51a and the actual luminance of the patch 51a by percent. Here, the actual luminance of the patch 51a is a luminance actually detected from the patch 51a arranged at the center of the image when taking the image with digital camera 20 under photographing conditions identical to photographing conditions for the image from which the estimated luminance $Y_p$ is calculated, excluding a photographing condition of arranging the patch 51a from which the luminance is detected at the center of the image, that is, the peripheral light quantity drop does not affect the patch 51a whose luminance is to be detected. In FIG. 10, the "Image Vertical Direction" and the "Image Lateral Direction" respectively expresses the position of the patch 51a in the vertical direction and the lateral direction of the test chart 51. As illustrated in FIG. 10, when drawing the patch 51a with the color identical to the reference region 55, the estimated luminance $Y_p$ of the patch 51a can be highly-accurately estimated such that an error between the estimated luminance Y, and the actual luminance of the patch 51a is, for example, within 1%.

As illustrated in FIG. 9, after the process of Step S164, the peripheral light quantity drop detecting unit 36b calculates a luminance correction coefficient $A_Y$ for the target patch 51a based on the estimated luminance $Y_p$, which is calculated at Step S164, and a luminance $Y_c$ at the center region arranged in a specific range at the center of the image 60 where the projective transformation is performed at Step S102 as shown in Formula 9 (Step S165). The luminance correction coefficient $A_Y$ is a coefficient to correct the luminance of the target patch 51a. The larger value of the luminance correction coefficient $A_Y$ means the large amount of peripheral light quantity drop. That is, the luminance correction coefficient $A_Y$ indicates the amount of peripheral light quantity drop. Here, the center region needs to be the identical color to the reference region 55. For example, the center region may be the reference region 55 closest to the center of the image 60 where the projective transformation is performed at Step S102, that is, in the example illustrated in FIG. 4, may be a reference region 55a. The luminance $Y_c$ at the center region is calculated based on the RGB value of the center region in the image 60 where the projective transformation is performed at Step S102, for example, as the formula shown in Formula 12.

$$A_Y = \frac{Y_c}{Y_p} \quad \text{[Formula 9]}$$

After the process of Step S165, the peripheral light quantity drop detecting unit 36b determines whether to target all the patches 51a in the test chart 51 in the image 60 where the projective transformation is performed at Step S102 or not (Step S166).

When the peripheral light quantity drop detecting unit 36b determines that the patch 51a not yet targeted is present at Step S166, the peripheral light quantity drop detecting unit 36b performs the process at Step S162.

When the peripheral light quantity drop detecting unit 36b determines that all the patches 51a are targeted at Step S166, the peripheral light quantity drop detecting unit 36b terminates the peripheral light quantity drop detecting process shown in FIG. 9.

The detection of the amount of peripheral light quantity drop in the test chart 51 is described above. However, the peripheral light quantity drop detecting unit 36b performs the peripheral light quantity drop detecting process shown in FIG. 9 similarly to the detection of the amount of peripheral light quantity drop in the reference chart 41.

As shown in FIG. 6, when terminating the peripheral light quantity drop detecting process at Step S103, the color value correction unit 36c of the control unit 36 performs the color value correction process that corrects the color value of the patch in the image 60 (Step S104).

Figure 11:
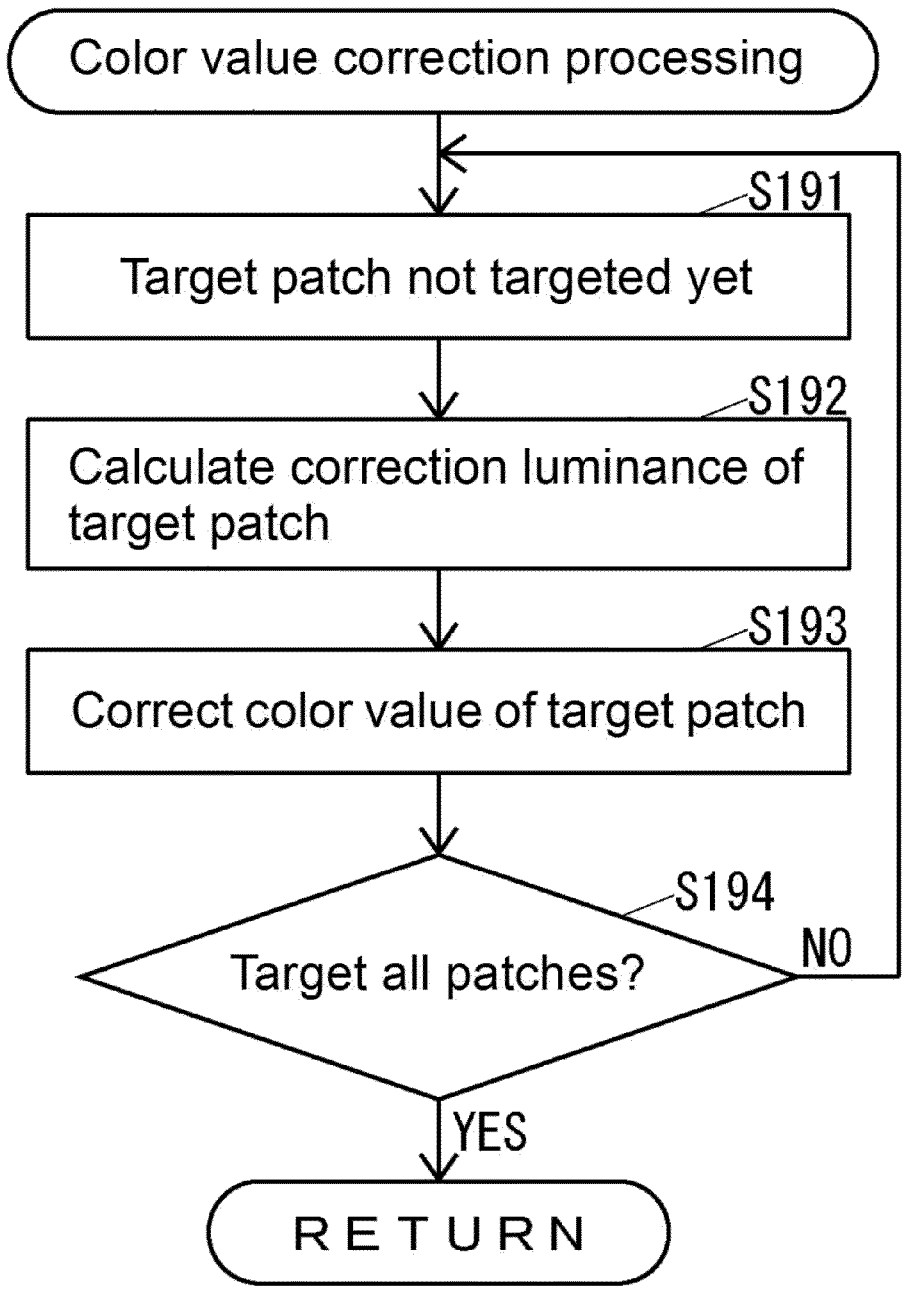
FIG. 11 illustrates a flowchart of a color value correction process according to the one embodiment.

FIG. 11 is a flowchart of the color value correction process shown in FIG. 6.

As shown in FIG. 11, the color value correction unit 36c targets the patch 51a not targeted yet among the plurality of patches 51a in the test chart 51 in the image 60 where the projective transformation is performed at Step S102 (Step S191).

Next, the color value correction unit 36c calculates a correction luminance $Y_a$ of the target patch 51a based on an actually measured luminance $Y_r$ of the target patch 51a and the luminance correction coefficient $A_Y$ of the target patch 51a calculated by the peripheral light quantity drop detecting process at Step S103, that is, the luminance from which an influence from the peripheral light quantity drop is eliminated, as shown in Formula 10 (Step S192). Here, the actually measured luminance $Y_r$ is calculated based on the RGB value of the target patch 51a in the image 60 where the projective transformation is performed at Step S102, for example, as the formula shown in Formula 12.

$$Y_a = Y_r \times A_Y \quad \text{[Formula 10]}$$

Next, the color value correction unit 36c corrects the RGB value of the target patch 51a based on the correction luminance $Y_a$, which is calculated at Step S192 (Step S193).

After the process of Step S193, the color value correction unit 36c determines whether to target the all patches 51a in the test chart 51 in the image 60 where the projective transformation is performed at Step S102 or not (Step S194).

When the color value correction unit 36c determines that the patch 51a not yet targeted is present at Step S194, the color value correction unit 36c performs the process at Step S191.

When the color value correction unit 36c determines that all the patches 51a are targeted at Step S194, the color value correction unit 36c terminates the color value correction process shown in FIG. 11.

The correction of the color value to the test chart 51 is described above. However, the color value correction unit 36c performs the color value correction process shown in FIG. 11 similarly to the correction of the color value in the reference chart 41.

As shown in FIG. 6, after having terminated the color value correction process of Step S104, the tone correction unit 36a generates a correction table of tone characteristics of the printer 33 based on a difference between the color value of the patch 41a in the reference chart 41 and the color value of the patch 51a in the test chart 51 corresponding to this patch 41a (Step S105). The color value used at Step S105 is corrected by the color value correction process at Step S104.

Next, the tone correction unit 36a stores the correction table, which is generated at Step S105, in the storage unit 35 (Step S106) and terminates the operations shown in FIG. 6.

Figure 12:
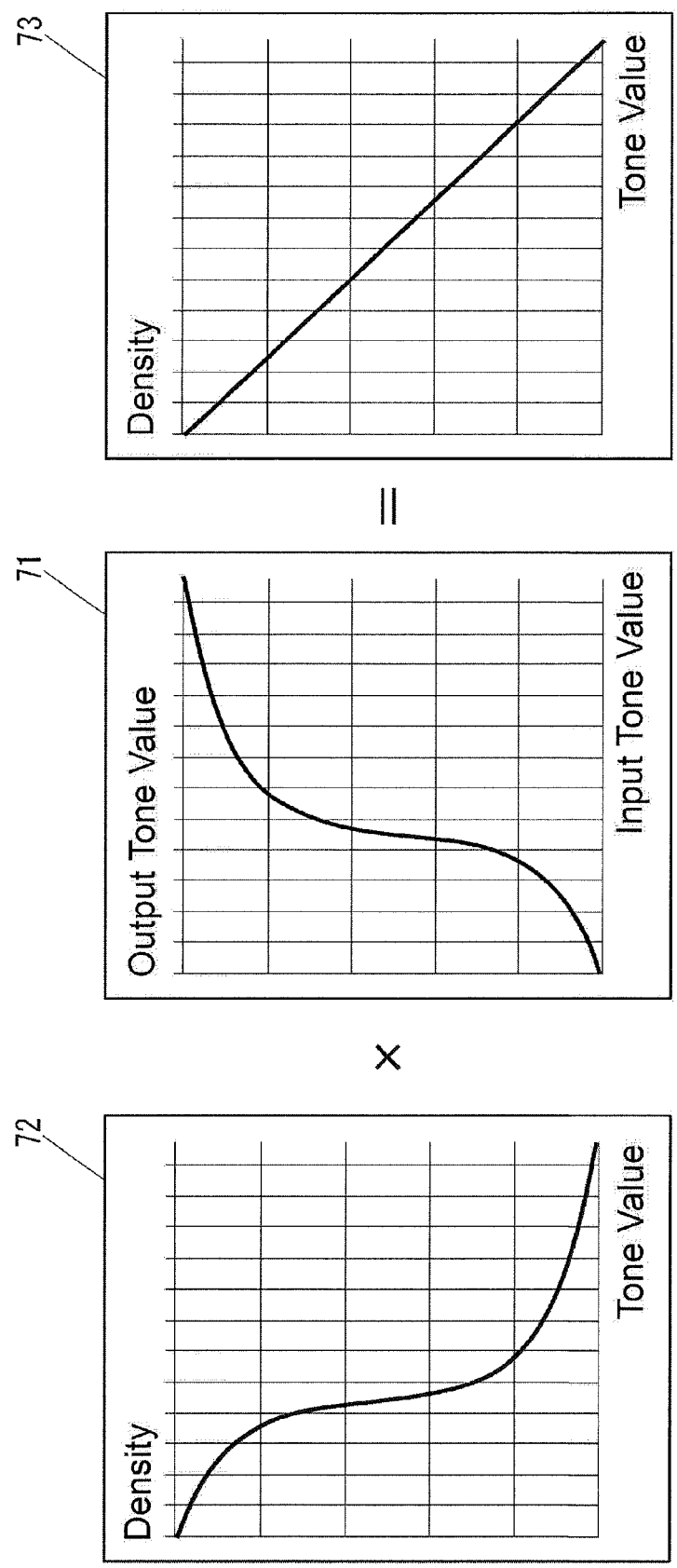
FIG. 12 illustrates a schematic diagram of principles of a correction table stored in a storage unit according to the one embodiment.

FIG. 12 is a schematic diagram illustrating principles of a correction table 71 stored in the storage unit 35 at Step S106.

As illustrated in FIG. 12, even if an actual tone characteristics 72 of the printer 33 is shifted from an expected tone characteristics 73, application of the correction table 71 to the actual tone characteristics 72 of the printer 33 ensures achieving the expected tone characteristics 73. That is, the tone correction unit 36a generates the correction table 71 of the tone characteristics of the printer 33 to correct the tone characteristics of the printer 33.

As described above, the printer-only machine 30 detects the amount of peripheral light quantity drop from each of the patches 41a and 51a in the image 60 generated by simultaneously taking the reference sheet 40 and the test sheet 50 with the digital camera 20 (Step S103). The printer-only machine 30 corrects the color values of the patches 41a and 51a in the image 60 based on the detected amount of peripheral light quantity drop (Step S104). The printer-only machine 30 corrects the tone characteristics based on the corrected color value (Step S105). This ensures the printer-only machine 30 to perform the highly-accurate calibration.

The patches 41a and 51a are drawn with various color values for performing the calibration. Accordingly, it is difficult to determine that the luminances of the patches 41a and 51a in the image 60 are based on only the original color values, or the original color values are changed by the influence of the peripheral light quantity drop. The printer-only machine 30 includes the reference regions 45 and 55, which are to detect the amount of peripheral light quantity drop, in the respective reference sheet 40 and test sheet 50. Therefore, based on the change in the luminances of the reference regions 45 and 55, the amount of peripheral light quantity drop in each of the patches 41a and 51a in the image 60 can be detected.

With the printer-only machine 30, some of the plurality of reference regions 45 are arranged in the reference chart 41. Accordingly, compared with the configuration where the all reference regions 45 are arranged outside of the reference chart 41, the plurality of reference regions 45 can be appropriately arranged dispersedly with respect to the plurality of patches 41a. Therefore, the printer-only machine 30 can highly-accurately detect the amount of peripheral light quantity drop in each of the patches 41a in the image 60. Accordingly, the printer-only machine 30 can perform the highly-accurate calibration. Similarly, with the printer-only machine 30, some of the plurality of reference regions 55 are arranged in the test chart 51. Accordingly, the printer-only machine 30 can perform the highly-accurate calibration.

With the printer-only machine 30, some of the plurality of reference regions 45 are arranged outside the reference chart 41. Accordingly, at least the one reference region 45 can be arranged at a part closer to the end of the image 60 than the patch 41a, that is, a part where the amount of peripheral light quantity drop is large. Therefore, the printer-only machine 30 highly-accurately detects the amount of peripheral light quantity drop of each of the patches 41a in the image 60, compared with the configuration where the all reference regions 45 are arranged at the part of small amount of peripheral light quantity drop. Accordingly, the printer-only machine 30 can perform the highly-accurate calibration. Similarly, with the printer-only machine 30, some of the plurality of reference regions 55 are arranged outside the test chart 51. Accordingly, the printer-only machine 30 can perform the highly-accurate calibration.

With the printer-only machine 30, the test chart 51 is an inversion of the reference chart 41. With this configuration, in the printer-only machine 30, assume that in a state where the reference chart 41 and the test chart 51 are aligned, the reference chart 41 and the test chart 51 are simultaneously taken with the digital camera 20 such that the position near the intermediate between the reference chart 41 and the test chart 51 becomes the center of the image. In this case, the peripheral light quantity drop affects the patches corresponding to one another in the reference chart 41 and the test chart 51 in the image 60 taken and generated by the digital camera 20 to a similar extent. Thus, an amount of corrected color value based on the amount of peripheral light quantity drop also becomes a similar extent. Accordingly, the printer-only machine 30 can highly-accurately correct the color values of the patches corresponding to one another in the reference chart 41 and the test chart 51 in the image 60. Accordingly, the printer-only machine 30 can perform the highly-accurate calibration.

The printer-only machine 30 detects the amount of peripheral light quantity drop in each patch based on the luminance at the center region where the amount of peripheral light quantity drop is small in the image 60 taken and generated by the digital camera 20. This ensures highly-accurately detecting the amount of peripheral light quantity drop in each patch. Accordingly, the printer-only machine 30 can perform the highly-accurate calibration.

The reference sheet 40 includes, not only the patches 41a, but also the reference regions 45. Accordingly, the patches 41a and the reference regions 45 can be easily and simultaneously taken by the digital camera 20. Similarly, the test sheet 50 includes, not only the patches 51a, but also the reference regions 55. Accordingly, the patches 51a and the reference regions 55 can be easily and simultaneously taken by the digital camera 20. Accordingly, the calibration system 10 can allow the user to perform the calibration in the simple procedure.

Figure 13:
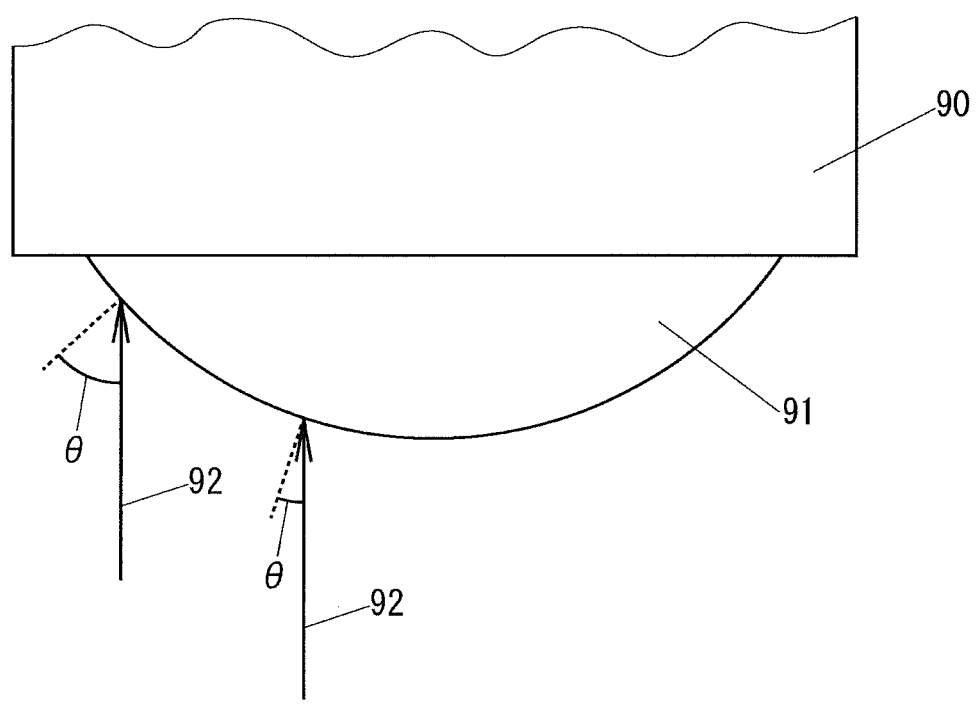
FIG. 13 is a a schematic diagram of a method for calibration in a comparative example and illustrates a lens of an imaging device from a side surface.

The following describes the effects of the disclosure by a comparison with the comparative example. FIG. 13 is a schematic diagram of a side view of a lens 91 of an imaging device 90 in the comparative example.

As illustrated in FIG. 13, the larger angle of incidence θ with respect to lights 92 from a front side the lens 91 of the imaging device 90 has, the closer to the end of the lens 91. Here, a light quantity I after the light 92 enters the lens 91 of the imaging device 90 is expressed based on a light quantity $I_0$ before the light 92 enters the lens 91 and the angle of incidence θ of the light 92 with respect to the lens 91 by the formula shown in Formula 11. Accordingly, in the image taken and generated by the imaging device 90, a so-called peripheral light quantity drop occurs.

$$I = I_0 \cos^4 \theta \quad \text{[Formula 11]}$$

In the image taken and generated by the imaging device, such as the digital camera, the peripheral light quantity drop occurs due to various causes, such as a photographing condition with the imaging device, as well as the above-described cause related to the formula shown in Formula 11.

Figure 14A:
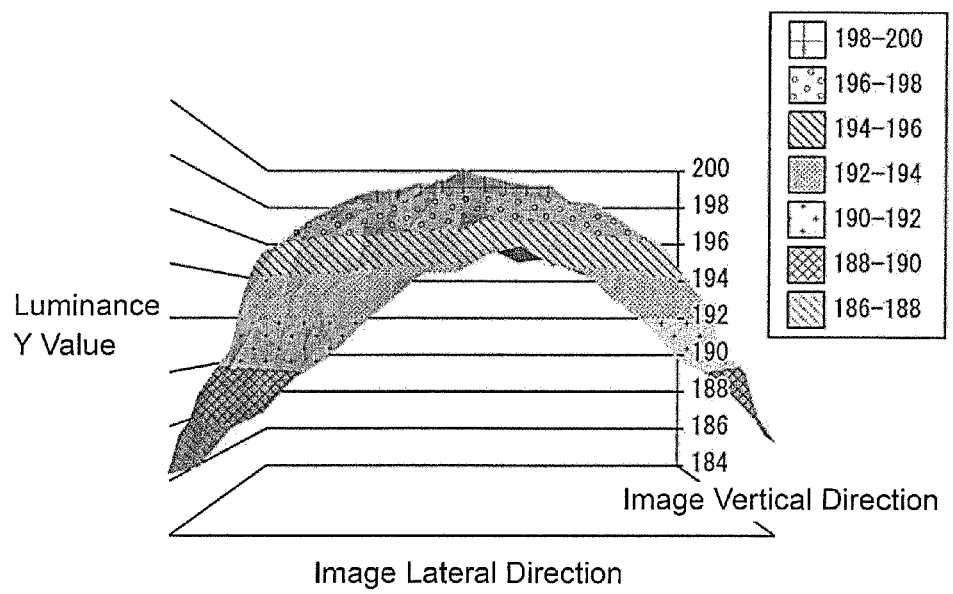
FIG. 14A illustrates a graph showing a luminance of an image taken and generated with the imaging device in the comparative example.
Figure 14B:
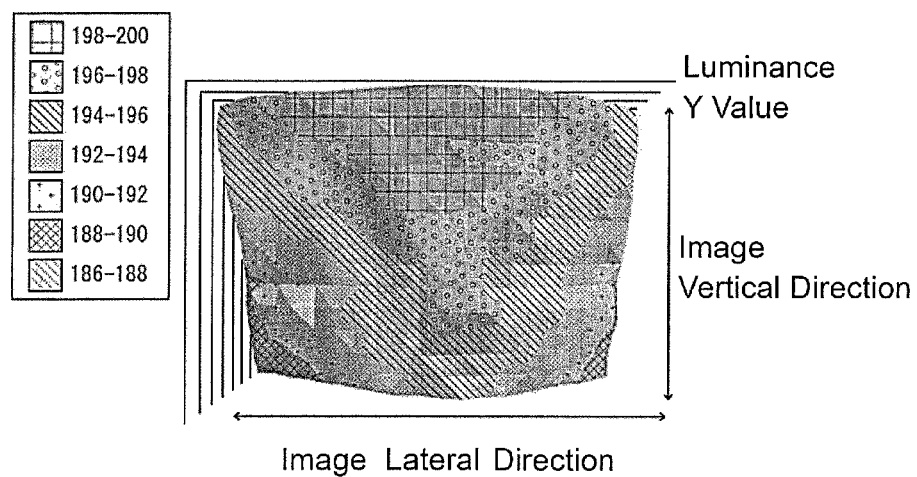
FIG. 14B illustrates a graph shown in FIG. 14A when observing the graph in a different viewpoint from FIG. 14A in the comparative example.

FIG. 14A is a schematic diagram illustrating a graph showing a luminance of an image taken and generated by the imaging device in the comparative example. FIG. 14B is a schematic diagram illustrating a graph shown in FIG. 14A when observing the graph in a different viewpoint from FIG. 14A.

The luminance of the image including a chart where the all patches have the identical color and taken and generated by the imaging device is, for example, as illustrated in FIG. 14A and FIG. 14B. In FIG. 14A and FIG. 14B, the "Image Vertical Direction" and the "Image Lateral Direction" respectively expresses the position of the patch in the vertical direction and the lateral direction of the chart.

Here, luminances Y in FIG. 14A and FIG. 14B are calculated based on the RGB values, which are the color values, by, for example, the formula shown in Formula 12.

$$Y = 0.299 \times R + 0.588 \times G + 0.114 \times B \quad \text{[Formula 12]}$$

As illustrated in FIG. 14A and FIG. 14B, in the image taken and generated by the imaging device, even if the patches are printed with the identical color, due to the peripheral light quantity drop, the luminance degrades as the part closes to the end of the image, thus lowering the RGB value. That is, the original patch color information is not correctly reflected to the image taken and generated by the imaging device due to the peripheral light quantity drop.

However, this calibration method does not consider the influence from the peripheral light quantity drop caused by the imaging device, thus arising a problem of failing to perform highly-accurate calibration. In contrast to this, even if the peripheral light quantity drop occurs, the disclosure can correctly reflect the original patch color information.

The printer-only machine 30 performs the projective transformation process in the embodiment; however, the projective transformation process may be omitted.

Although the image forming apparatus of the disclosure is the printer-only machine in the embodiment, the image forming apparatus may be an image forming apparatus other than the printer-only machine. For example, the image forming apparatus of the disclosure may be an image forming apparatus such as an MFP, a copy-only machine, and a fax-only machine.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus, comprising:
   a print device;
   a tone correction unit that corrects a tone characteristic of the print device based on color values of a plurality of color patches of each of a reference chart and a test chart in an image, the image being generated by simultaneously taking a reference sheet and a test sheet by an imaging device, the reference chart including the plurality of color patches is drawn on the reference sheet, the test chart including the plurality of color patches is printed on the test sheet by the print device;
   a peripheral light quantity drop detecting unit that detects an amount of a peripheral light quantity drop caused by the imaging device for each patch in the image; and
   a color value correction unit that corrects the color value of the patch in the image based on the amount of the peripheral light quantity drop detected by the peripheral light quantity drop detecting unit;
   wherein the tone correction unit corrects the tone characteristic based on the color value corrected by the color value correction unit,
   at least one of the reference sheet and the test sheet includes a plurality of reference regions arranged at specific positions with respect to the patches, and
   the peripheral light quantity drop detecting unit detects the amount of the peripheral light quantity drop in each of the patches based on the positions and luminances of the plurality of reference regions in the image and the positions of the patches in the image.

2. The image forming apparatus according to claim 1, wherein at least one of the reference regions is arranged at an inside of at least one of the reference chart and the test chart.

3. The image forming apparatus according to claim 1, wherein at least one of the reference regions is arranged at an outside of at least one of the reference chart and the test chart.

4. The image forming apparatus according to claim 1, wherein the test chart includes an inversion of the reference chart.

5. The image forming apparatus according to claim 1, wherein at least one of the reference sheet and the test sheet includes a center region, the center region having an identical color to the reference region, the center region being arranged in a specific range at a center of the image, and
   the peripheral light quantity drop detecting unit detects the amount of the peripheral light quantity drop for each of the patches based on the positions and the luminances of the plurality of reference regions in the image, the positions of the patches in the image, and a luminance at the center region in the image.

6. A non-transitory computer-readable recording medium storing a calibration program, the calibration program being executed by an image forming apparatus that includes a print device, the calibration program causing the image forming apparatus to function as:
   a tone correction unit that corrects a tone characteristic of the print device based on color values of a plurality of color patches of each of a reference chart and a test chart in an image, the image being generated by simultaneously taking a reference sheet and a test sheet by an imaging device, the reference chart including the plurality of color patches is drawn on the reference sheet, the test chart including the plurality of color patches is printed on the test sheet by the print device;
   a peripheral light quantity drop detecting unit that detects an amount of a peripheral light quantity drop caused by the imaging device for each patch in the image; and
   a color value correction unit that corrects the color value of the patch in the image based on the amount of the peripheral light quantity drop detected by the peripheral light quantity drop detecting unit;
   wherein the tone correction unit corrects the tone characteristic based on the color value corrected by the color value correction unit,
   at least one of the reference sheet and the test sheet includes a plurality of reference regions arranged at specific positions with respect to the patches, and
   the peripheral light quantity drop detecting unit detects the amount of the peripheral light quantity drop in each of the patches based on the positions and luminances of the plurality of reference regions in the image and the positions of the patches in the image.

7. A calibration system comprising:
   an image forming apparatus including a print device; and
   an imaging device,
   wherein the image forming apparatus including:
      a tone correction unit that corrects a tone characteristic of the print device based on color values of a plurality of color patches of each of a reference chart and a test chart in an image, the image being generated by simultaneously taking a reference sheet and a test sheet by an imaging device, the reference chart including the plurality of color patches is drawn on the reference sheet, the test chart including the plurality of color patches is printed on the test sheet by the print device;
a peripheral light quantity drop detecting unit that detects an amount of a peripheral light quantity drop caused by the imaging device for each patch in the image; and
a color value correction unit that corrects the color value of the patch in the image based on the amount of the peripheral light quantity drop detected by the peripheral light quantity drop detecting unit;
wherein the tone correction unit corrects the tone characteristic based on the color value corrected by the color value correction unit,
at least one of the reference sheet and the test sheet includes a plurality of reference regions arranged at specific positions with respect to the patches, and
the peripheral light quantity drop detecting unit detects the amount of the peripheral light quantity drop in each of the patches based on the positions and luminances of the plurality of reference regions in the image and the positions of the patches in the image.

* * * * *